United States Patent
Matthews et al.

(10) Patent No.: US 6,430,707 B1
(45) Date of Patent: Aug. 6, 2002

(54) SOURCE-LEVEL DEBUGGING OF CLIENT DUMP IMAGE IN A COMPUTER NETWORK

(75) Inventors: Gareth Christopher Matthews, Jacksonville, FL (US); Edwin James Hilpert, Jr., Round Rock, TX (US); David H. Evans; Brian L. Naylor, both of Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,684

(22) Filed: Mar. 31, 1999

(51) Int. Cl.[7] ............................................. H04L 1/22
(52) U.S. Cl. .................................. 714/37; 710/11
(58) Field of Search .............................. 714/37, 15, 25, 714/38, 39, 41, 43, 47, 48, 49, 31, 18; 709/203, 206, 217, 218; 710/11, 12, 20

(56) References Cited

U.S. PATENT DOCUMENTS

| | | | |
|---|---|---|---|
| 5,339,406 A | * 8/1994 | Carney et al. | 395/575 |
| 5,560,009 A | 9/1996 | Lenkov et al. | 395/700 |
| 5,581,695 A | 12/1996 | Knoke et al. | 395/183.04 |
| 5,659,753 A | 8/1997 | Murphy et al. | 395/705 |
| 5,958,010 A | * 9/1999 | Agarwal et al. | 709/224 |
| 6,023,581 A | * 2/2000 | Matsuura | 395/704 |
| 6,026,414 A | * 2/2000 | Anglin | 707/204 |
| 6,163,856 A | * 8/2000 | Noguchi et al. | 714/44 |
| 6,141,759 A | * 10/2000 | Braddy | 713/201 |
| 6,167,358 A | * 12/2000 | Othmer et al. | 702/188 |
| 6,172,672 B1 | * 1/2001 | Ramasubramanian et al. | 345/327 |
| 6,182,139 B1 | * 1/2001 | Brendel | 709/226 |
| 6,260,069 B1 | * 7/2001 | Anglin | 709/229 |

* cited by examiner

*Primary Examiner*—Nadeem Iqbal
(74) *Attorney, Agent, or Firm*—David A. Mims, Jr.; Bracewell & Patterson, L.L.P.

(57) ABSTRACT

A client station on computer network uses an operating system such as JavaOS which is permanently stored at the server rather than on storage media at the client location. JavaOS is loaded and installed at the client upon bootup of the client. Java is an interpreted language; the source is available at the server and is downloaded as such. Upon the occurrence of a malfunction that causes the client to go off-line, i.e., disappear from the network, a dump image is sent to the server before the client reboots, so that the cause of failure can be determined. The dump image includes the contents of memory, including the JavaOS operating system, and the stack, threads, registers, and local/global variables, which can be analyzed at a source level. This image is sent to the server in formatted packets, by a path separate from that of the TCP/IP network protocol, since the client would not be functioning properly on the network. At the server, the packets making up the dump image are stored on storage media, and the image is reformatted for use by a standard debugging tool, ICAT.

18 Claims, 6 Drawing Sheets

# SOURCE-LEVEL DEBUGGING OF CLIENT DUMP IMAGE IN A COMPUTER NETWORK

BACKGROUND OF THE INVENTION

1. Technical Field

This invention relates to computer systems and networks, and more particularly to sending and retrieving client dump data for debugging at a server on a network such as the internet.

2. Description of the Related Art

A client network computer system may in some instances be in the form of a minimally-configured unit having only the basic components needed to input and output data by a user. All of the applications software and long-term storage of data is provided by a server somewhere else on the network. This type of client station is sometimes called a network computer, in that it is operable only when connected to the network rather than as a stand-alone unit. The client station does not have permanent storage media such as a hard disk drive or a CD-ROM drive, but instead merely accesses any needed data from a remote server via the network.

In addition to relying on the server and the network for applications programs and for long-term data storage, the client station may also rely on the network link for its operating system. JavaOS™ is an example of such an arrangement. JavaOS is an operating system maintained at a server on a network for downloading by a client each time the client comes online at bootup. The client station contains in its hardware a minimumally-sufficient ROM-based operating system code to log onto the network at power-on and begin to retrieve information from the server, and so it immediately starts installing its operating system into local memory upon boot-up as the code is received from the server. Then, after the operating system software is installed, the applications programs needed are retrieved from the server and installed in system memory.

The client station using a JavaOS server-provided operating system or the like can incur problems and situations that may cause the local station to malfunction, i.e., go-offline or stop functioning properly as a client on the network. The preferred method to debug these problems is through the analysis of a system dump by the server or at the server location with the help of a dump formatting tool. Since the operating system used by the client does not have local permanent storage media in most cases, the only viable target media for dump files resides on the server. In a typical network such as the internet, the only means of transmitting data from the client to the server is via the network (TCP/IP) connection. Unfortunately, it is very possible that the malfunction condition or event triggering the need to deliver a system dump of the client's register and memory data has also likely caused the TCP/IP stack to be damaged or destroyed. In any event, since the cause of the event or condition may not be known until the client station data has been dumped and debugged, it cannot be assumed that the TCP/IP stack is intact.

The methods presently used for debugging and analyzing an operating system post-mortem dump image are functioning at assembly level, rather than source level. It would be desirable to provide the ability to view the code, stack, threads, registers, and local/global variables at a source level. Most post mortem analyzer tools dump assembly code or interpret system structure information.

SUMMARY OF THE INVENTION

It is therefore one object of the present invention to provide an improved method of determining the cause of a malfunction condition in a computer system.

It is another object of the present invention to provide an improved method of debugging a post-mortem operating system dump image, at source level.

It is yet another object of the present invention to provide an improved way of providing debugging services at a server location for a client operating system in a computer network.

It is a further object of the invention to provide an improved way of using standard debugging technology to debug a live operating system and/or a post-mortem dump of the operating system.

It is still another object of the invention to provide an improved way of providing faster diagnosis of system-level information by using standard debugging tools, allowing faster start-up time for service organizations by using the same debug tools to understand dump files.

The above as well as additional objects, features, and advantages of the present invention will become apparent in the following detailed written description.

According to one embodiment of the invention, a client station on computer network uses an operating system such as JavaOS which is permanently stored at the server rather than on storage media at the client location. The JavaOS is loaded and installed at the client upon bootup of the client. Java is an interpreted language; the source is available at the server and is downloaded as such. Upon the occurrence of a malfunction that causes the client to go off-line, i.e., disappear from the network, a dump image is sent to the server before the client reboots, so that the cause of failure can be determined. The dump image includes the contents of memory, including the operating system (JavaOS in the example), and the code, stack, threads, registers, and local/global variables, which can be analyzed at a source level. This image is sent to the server in formatted packets, by a path separate from that of the network protocol, e.g., TCP/IP, since the client would usually not be functioning properly on the network. At the server, the packets making up the dump image are stored on storage media, and the image is reformatted for use by a standard debugging tool such as ICAT (Interactive Code Analysis Tool).

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment, when read in conjunction with the accompanying drawings, wherein:

DETAILED DESCRIPTION OF PREFERRED EMBODIMENT

Figure 1:
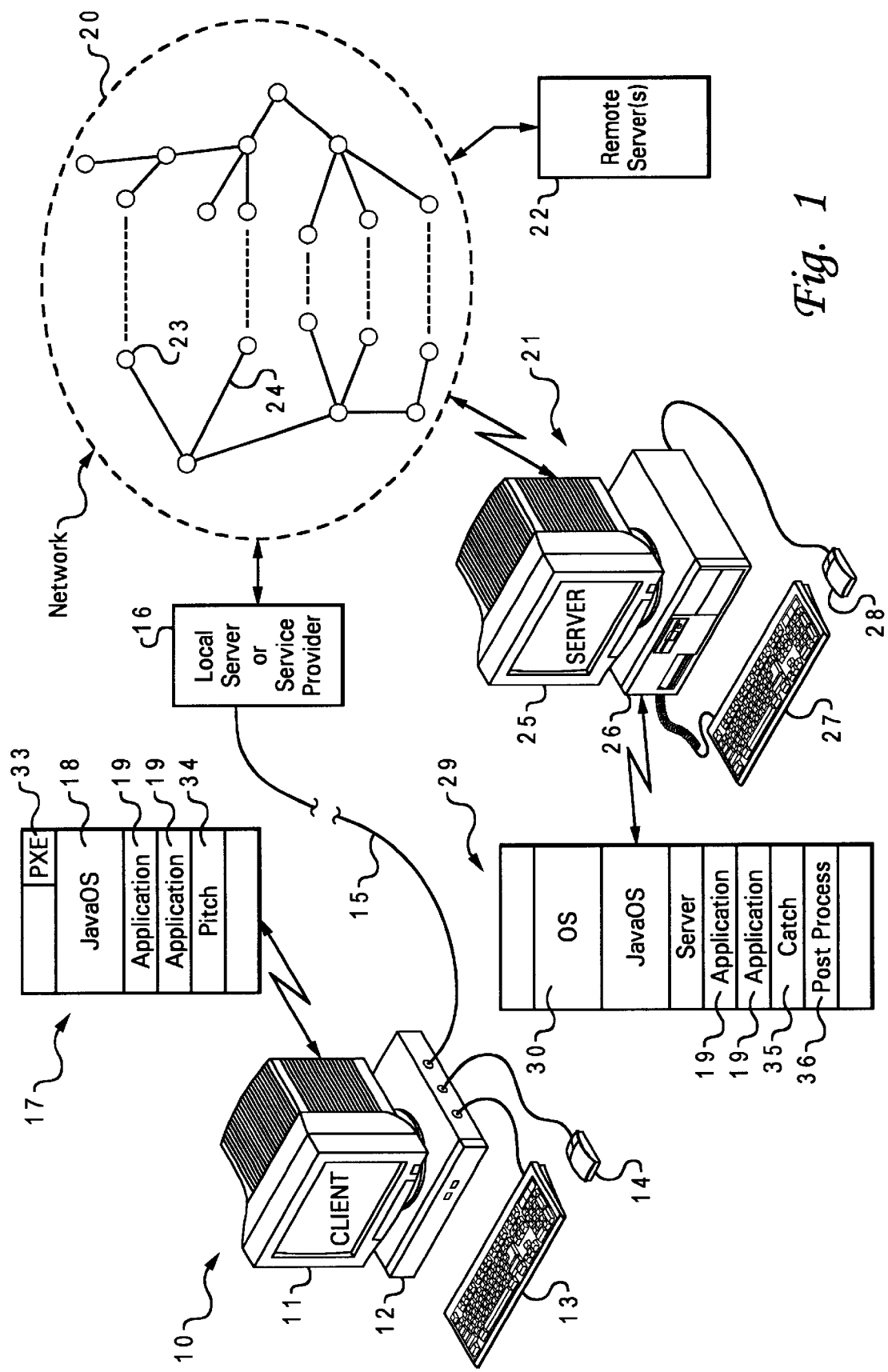
FIG. 1 is an electrical diagram in block form of a computer network which may use features of the present invention.

Referring to FIG. 1, a network system is shown in which concepts of the invention may be used. A client computer station 10 is employed by the user to obtain information from a network such as the internet. The client station 10 in this case often includes minimal hardware and software, such as a monitor 11, a small system unit 12, a keyboard 13, and a mouse 14. The system unit contains a CPU and system memory, and an adapter card or modem for connection to a network, but often no hard disk or other local storage media. For example, the station 10 may be connected by a modem and a phone line 15, or by a cable, to an internet server 16 or service provider. The system memory 17 contains an operating system 18, e.g., JavaOS, which was downloaded from a remote server after the client station 10 was booted up. In addition, the memory 17 includes applications programs 19 for accessing the network, such as a TCP/IP stack, an HTTP-compliant web browser such as Netscape Navigator®, as well as an email client which supports simple mail-transfer protocol (SMTP) used for e-mail, for example, and these applications programs are also loaded via the network link from a remote server, after the station 10 is booted. The interface server 16 or service provider is connected to the internet 20, or network of this type. Thus, the client station 10 is able to send and receive messages to and from other stations on the network 20, and to retrieve information from the network or internet 20, using standard internet connections and applications software.

The internet 20 allows the user at client station 10 to link with other servers and networks such as servers 21 and 22 to retrieve data and programs. The term internet refers to the collection of networks and gateways 23 and 24 that utilize the TCP/IP suite of protocols. TCP/IP is an acronym for "Transport Control Protocol/Interface Program," a software protocol for communication between computers. The internet 20 is a system of geographically distributed computer networks interconnected by computers executing networking protocols allowing users to interact and share information over the networks. The internet has evolved as an "open" system for which developers can design software applications for performing specialized operations or services, essentially without restriction.

The server 21 in this example has a monitor 25, a system unit 26, a keyboard 27, and a mouse 28. The system unit 26 contains a CPU and system memory, and an adapter card or modem for connection to the network 20, and server-level storage such as hard disk drives and other storage media. The system memory 29 contains an operating system 30, and a copy of the client operating system, JavaOS, which is to be downloaded from this remote server when the client station 10 is booted up. In addition, the memory 29 includes applications programs such as server software as well as copies of the applications programs 19 for sending to the client stations. The server software is of course capable of accessing the network, such as by an HTTP-compliant web server as well as function as an email server which supports SMTP.

The client station 10 using the JavaOS server-provided operating system can incur problems and situations that may cause the local station 10 to crash, i.e., malfunction, go-offline or stop functioning properly as a client on the network 20. The usual method of debugging problems is through the analysis of a system dump by the server 21 or at the server location with the help of a dump formatting tool. Since the operating system 18 used by the client does not have local permanent storage media in most cases, the only viable target media for dump files reside on the server 21. In a typical network such as the internet 20, the usual means of transmitting data from the client 10 to the server 21 is via the network (TCP/IP) connection. Unfortunately, it is very possible that the malfunction condition or event causing the crash, i.e., triggering the need to deliver a system dump of the client's register and memory data, has also likely caused the TCP/IP stack in application 19 to be damaged or destroyed. In any event, since the cause of the event or condition may not be known until register and memory data of the client station 10 has been dumped and debugged at server 21, it cannot be assumed that the TCP/IP stack of the client 10 is intact.

Consequently, to ensure a remote dump capability under all conditions in the system of FIG. 1, the JavaOS client application 19 includes a secondary means of communication with server 21 that exists independent of the normal operating mechanism of the client 10, i.e., independent of the TCP/IP stack. Ideally, this capability would exist in the hardware and be unalterable by the software. Fortunately, this hardware mechanism currently exists and is a required feature for support of JavaOS on Intel platforms via preboot execution or PXE code 33. However, the usual JavaOS scheme is that, once the PXE boot process is complete, the system returns the memory occupied by the UDP stack to the system heap.

The Preboot Execution (PXE) 33, as defined in the Intel Corporation's "Wired for Management Baseline" document, specifies that a boot time UDP stack is required to boot JavaOS on Intel platforms such as client 10. The current PXE boot process discards the UDP stack once the boot process is complete. In order to utilize this UDP stack for later system dumps to the server, the JavaOS 18 must reserve the UDP stack subsequent to completion of the boot process instead of reallocating it to the general system heap.

In this embodiment illustrated with reference to FIG. 1, there are three components that will be described: the client-side "pitcher" 34, the server side "catcher" 35, and a dump file post processor 36, which will "format" the file for use by the ICAT. Upon invocation, the client 10 writes packets to the dump daemon, written in Java and located on the server 21, which will accept dump packets and place them in an appropriately named file and directory so that dumps from different network computers and at different times are kept separate. The IP address for the dump daemon will be provided to JavaOS with its boot information, so that UDP packets can be addressed and constructed properly. It is desirable to allow the entire dump process to be turned on or off, so this is a configurable parameter.

The size of the dumps can be quite large. Dump times will depend on the network traffic but likely will take several minutes to complete. During this time, it is necessary to inform the user at client station 10 that a dump is underway, and provide a progress indicator so that the dump in not interrupted by the user hitting the system reset button. In this case, the progress indicator will be a number counting down, which represents that amount of time left to be transferred.

To implement the pitcher function 34 used in the client 10, the JavaOS PXE boot mechanism will be modified to preserve the UDP stack subsequent to the boot process. The memory that will be reserved for the UDP stack and client "pitcher" 34 will reside in the lower 640 k byte region because all of this code will be real mode. The basic flow of the client pitcher 34 will be described with reference to FIG. 2.

Figure 2:
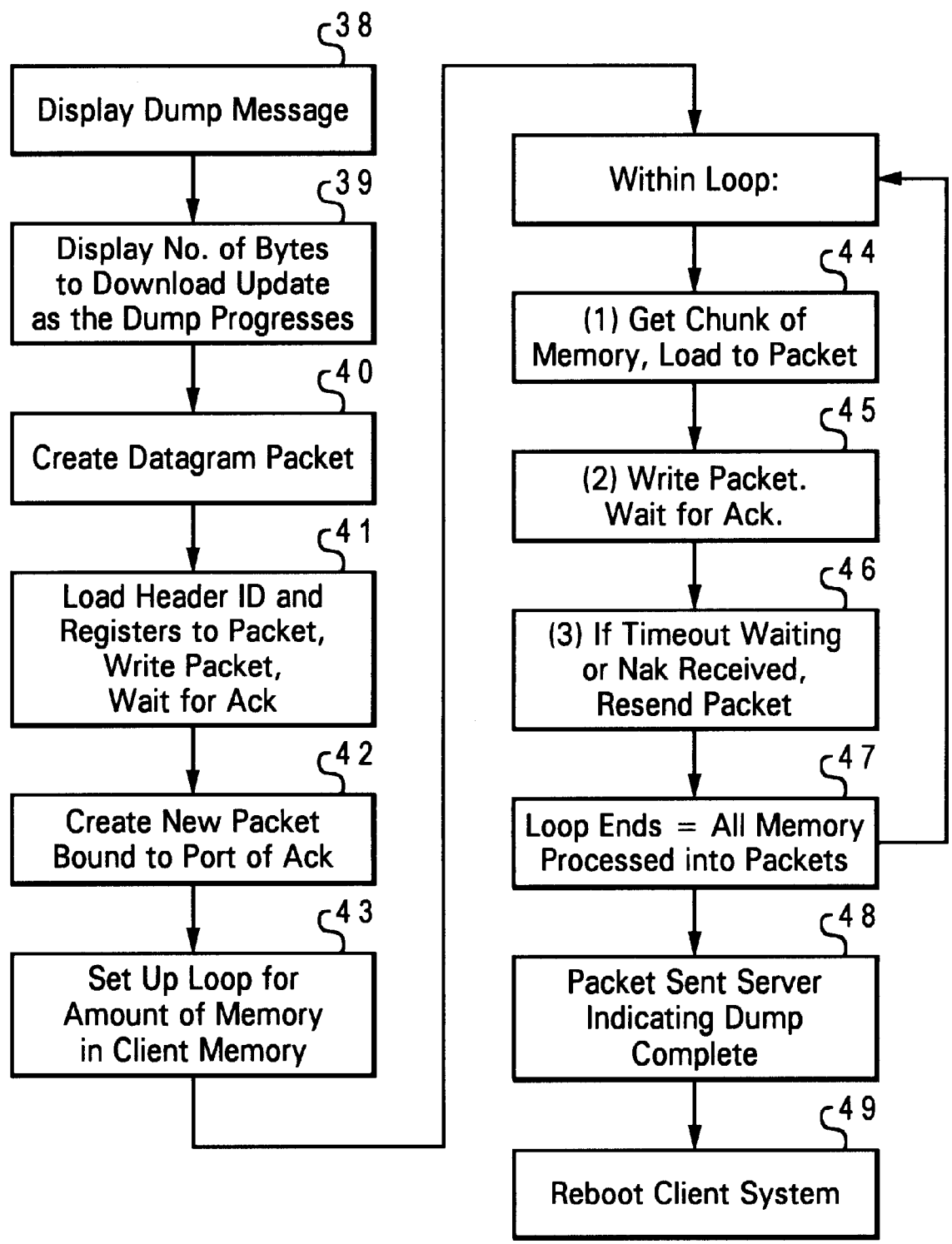
FIG. 2 is a logic flow chart of the method used for gathering and sending the dump image at the client and sending it to the server in the system of FIG. 1, according to one embodiment of the invention.

The first step is to put a message to the screen 11 informing the user that the system is being dumped, as illustrated by the block 38 of FIG. 2. Next, display on screen 11 the number of bytes to download and update it as the dump progresses, block 39. Then, create a datagram packet bound to the dump server 21 host name and a known port, block 40. Next, stuff the header identification information and all the registers of the CPU of client 10 into that packet, write it and wait for the ack, as seen in block 41. Then, create a new datagram packet bound to the port that the ack came in on, block 42. A loop is set up for the amount of memory in the client system's memory, block 43, and within the loop the steps are: (1) get a chunk of memory and stuff it into the packet, block 44, (2) write the packet and wait for the ack, block 45, and (3) if timeout expires while waiting or a nak is received, resend packet, block 46. The loop ends when all the memory is processed into packets, block 47, and then a packet is sent to the server 21 that indicates the dump is complete, block 48. The last step is to reboot the client system 10, block 49, after which it is expected the client will go back online, while the reason for the crash will be preserved in the dump data now at the server 21.

Figure 3:
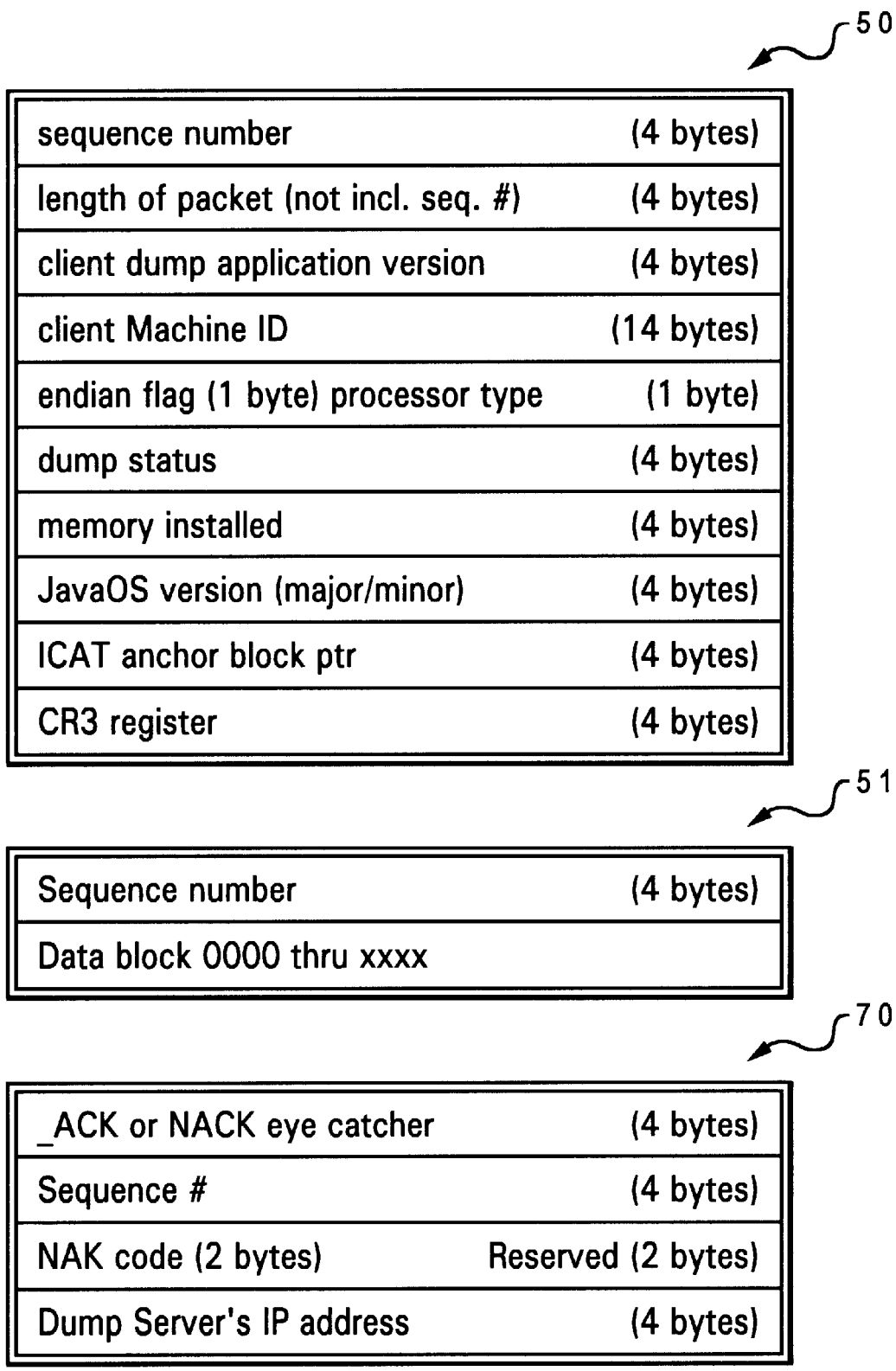
FIG. 3 is a diagram of the format of a packet in the system of FIG. 1.

The format of first dump "initiation" packet 50 created in block 40 and sent in block 41 is illustrated in FIG. 3, which also illustrates the format of all following dump data packets 51. The first packet will have a sequence number of 1, the following packets will have the next number in order as their sequence number, and the last packet's sequence number will be −1. If the server side daemon, catcher 35, is not running, the pitcher 34 will timeout waiting for an ack and resend the packet 51. After a number of retries, the client 10 will give up and reboot.

The server-side dump daemon or pitcher 35 is written in Java language, making it portable to all platforms. It has a main thread which listens on a reserved port. When a client 10 initiates a dump, the dump daemon 35 creates a new thread to talk to that client, which uses a different port to reduce collisions. The flow is as illustrated in FIG. 4.

Figure 4:
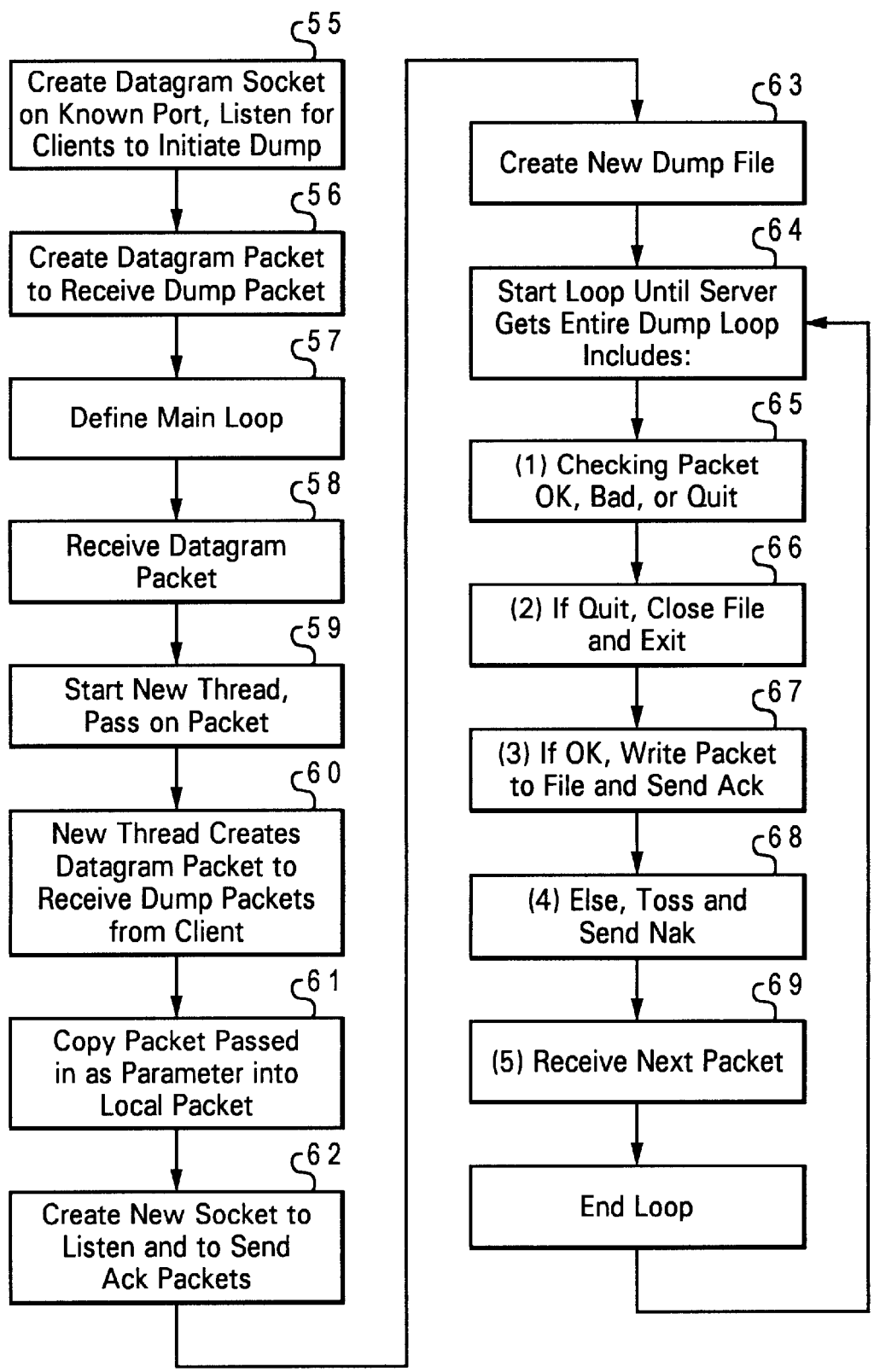
FIG. 4 is a logic flow chart of the method used for receiving and storing the dump image at the server in the system of FIG. 1, according to one embodiment of the invention.

As seen in flow chart format in FIG. 4, the first step in the dump daemon 35 is to create a datagram socket on the known port to listen for clients 10 to initiate a dump according to FIG. 3. This step is illustrated by block 55. Next, a datagram packet is created to receive the dump packet, block 56. A main infinite loop is defined at block 57 and the steps in this loop are to receive a datagram packet at block 58 and to start a New Thread and pass on the packet, block 59. The New Thread at block 60 creates a datagram packet to receive dump packets from the client 10 at block 61, then copies the packet passed in as a parameter into the local packet, block 62. Next, a new socket is created to listen on and to send ack packets back to the client 10, block 62. A new dump file is created to hold this dump, block 63. A loop is started until the server gets the entire dump, block 64; this loop includes checking the packet to see that it is either OK, BAD, or QUIT, block 65. If QUIT, close the file and exit, block 66, or if OK, write the packet to the file and send and ACK, block 67, else, toss it and send a NAK, block 68. Then receive the next packet, block 69, then end the loop.

The ACK/NAK packet 70 is small, 16-bytes, and has the format seen in FIG. 3. The NAK code tells the dump "pitcher" 34 one of the following: (a) QUIT sending the dump; (b) RESEND the last packet; (c) REBOOT client 10; (d) GOTO the IP address specified to send the dump to. The last code, GOTO, is intended to allow another server, other than the boot server 21, to act as the dump "catcher". This allows multiple dump servers, and also provides a means to switch dump servers in case the filesystem is full and cannot store the entire dump.

Figure 5:
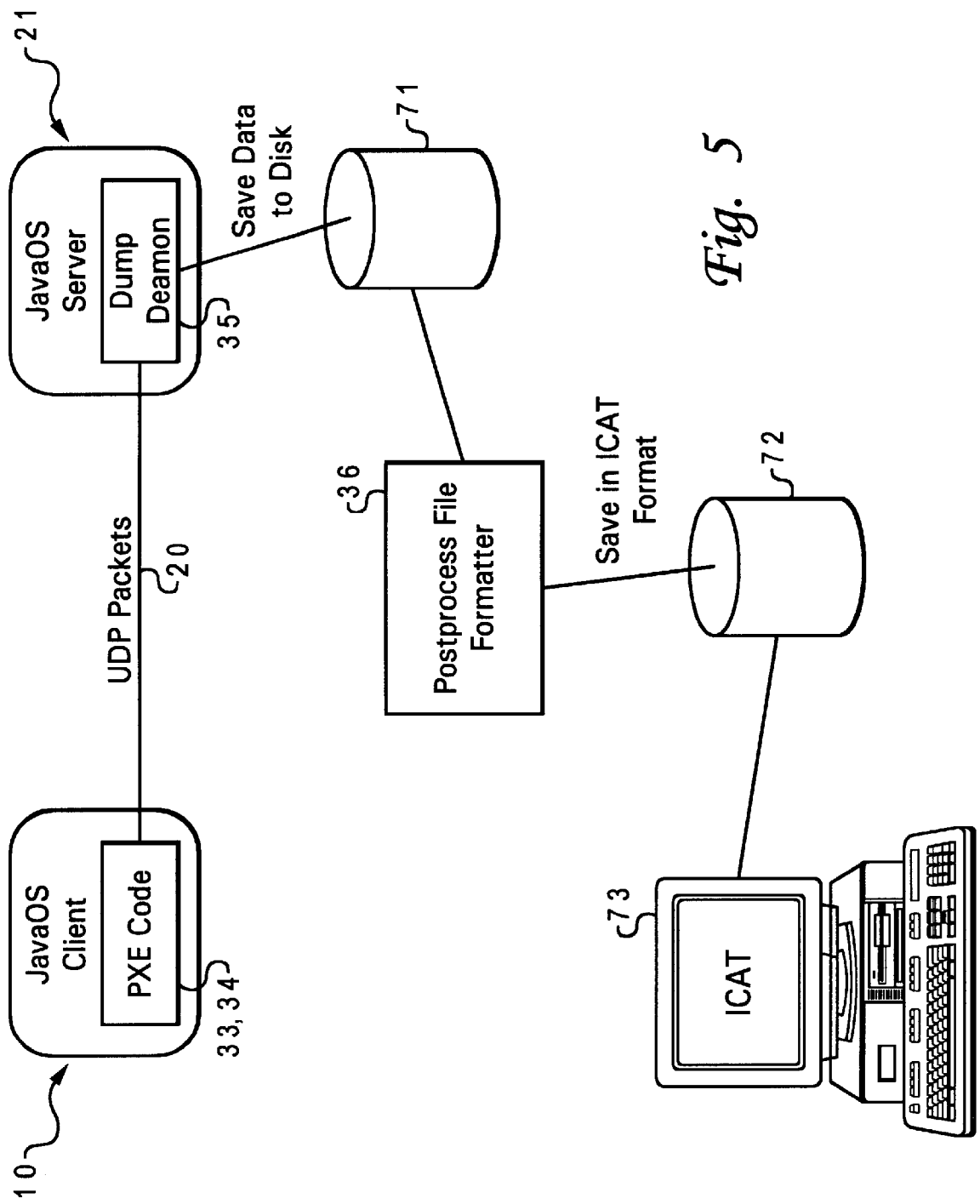
FIG. 5 is a simplified diagram of the system of FIG. 1 illustrating the data flow.

Referring to FIG. 5, an overview of the dump enablement arrangement as thus far described is illustrated. The pre-execution code and "pitcher" code 33, 34 is located in the client 10, and sends dump data via UDP packets on the network 20 to the server 21. The dump daemon 35 at the server 21 saves the packets to disk storage 71, and then post-processor 36 (which may run on the server 21 or on another platform) saves the dump data to disk 72, which may be the same as disk 71. A processor 73 (e.g., the server platform 21 or another unit) accesses the ICAT formatted dump data on the disk 72 for debugging.

The dump file that is created on the disk 71 has a name that is dump +# milliseconds since Jan. 1, 1970. This gives unique file names and the date and time that the dump occurred can be determined and reported by the post processing tool. The dumps are contained in the following directory structure:

```
dumpfiles/
    machineID1/    (eg. 010060083FE9A5)
        dump899212311340
        dump899236530970
    machineID2/
        dump899238035280
    machineID3/
        dump899238111840
```

The machine ID is the card type (01 for the ethernet and 06 for token ring) plus the MAC address, which makes each client machine directory name unique.

The dump formatter 36 is ICAT. ICAT is a tool that has been in use for some time as a live, interactive debugger. This tool is used because many developers are already familiar with its interface, and because it is already a tried-and-true tool. ICAT relies on an active system to debug, not a flat file memory dump; therefore, the post-processor 36 is used to recast the dump file on disk 71 and create a dump file on disk 72 in the format which the ICAT tool can use. Lastly, referring to FIG. 6, ICAT references addresses as virtual addresses, where the memory blocks represent physical addresses; to handle this issue, a virtual-to-physical address translator as illustrated is included as part of the reformatting of the raw file into the ICAT format file. It is understood that the ICAT station 73 has access to the source code that comprised the client memory 17 at the time of failure. The source and the ICAT-formatted file 72 allow for a source-level, post-mortem debug of the client JavaOS at the point of failure.

Figure 6:
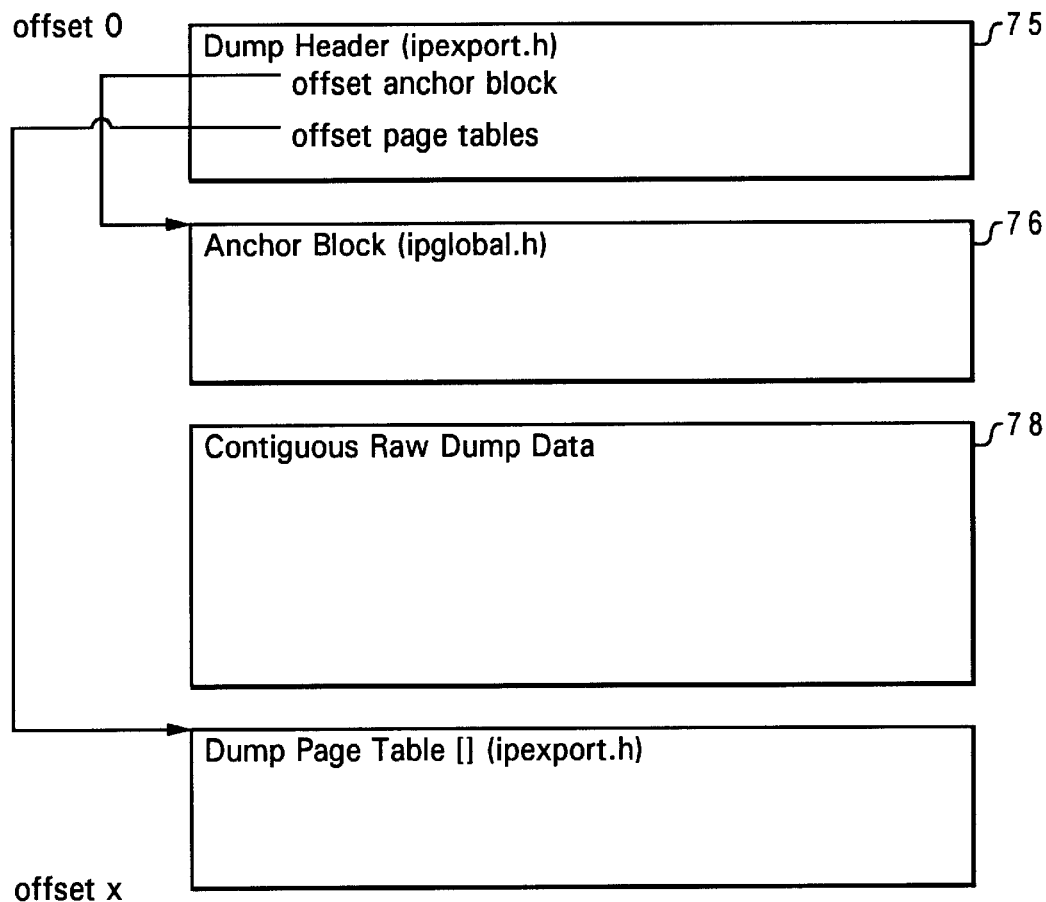
FIGS. 6 and 7 are diagrams of the format of a raw dump file as employed in the system of FIGS. 1–4.
Figure 7:
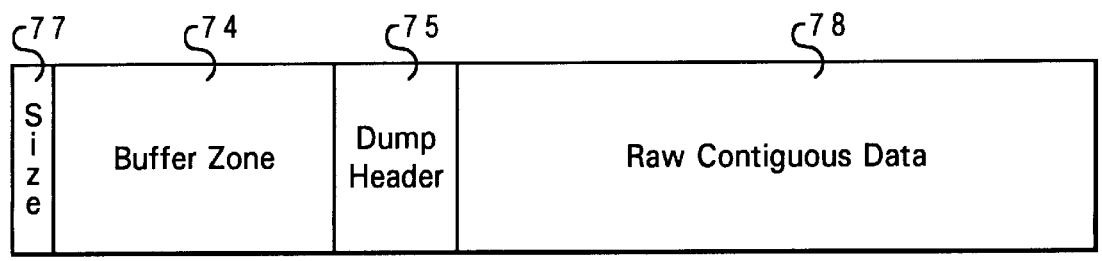

Referring to FIGS. 6 and 7, the organization of the raw dump file on disk 71 is very simplistic. It starts with an empty "buffer zone" 74, which is reserved for the reformatting tool 36 to place the header block 75 and anchor block 76 when it converts the file into the ICAT format file for disk 72. The first four bytes 77 of the file contain the size of this "buffer zone" 74. Next is the dump header 75, which contains information regarding the time and failure type, as well as the pointer to anchor block 76 and the registers at the time of the failure. The anchor block 76 will contain pointers to important/interesting data structures within the system to be used for navigating through the system data structures and analyzing what went wrong. The organization of the rest of the dump file is simply a raw contiguous dump of memory 78.

While the invention has been shown and described with reference to a particular embodiment, it will be understood that various changes in form and detail of the preferred embodiment, as well as other embodiments of the invention, may be made by those skilled in the art without departing from the true spirit and scope of the invention.

What is claimed is:

1. A method of processing an image from a client connected to a server utilizing a first protocol on a network, comprising the steps of:

upon the occurrence of an event at said client initiating a analysis, sending an image of conditions of said client to a server on said network utilizing a second protocol; said step of sending including transmitting a number of packets of data making up said image;

storing said packets making up said image by said server;

converting said packets to a format usable by a standard analysis tool.

2. A method according to claim 1 wherein said image is a dump image, said conditions include memory and registers of said client, and said analysis includes failure analysis.

3. A method according to claim 2 wherein said image includes an operating system being executed by said client.

4. A method according to claim 3 wherein said operating system is loaded from said server upon boot-up of said client.

5. A method according to claim 4 wherein said operating system is JavaOS.

6. A method according to claim 5 wherein said image is converted to source code at said server.

7. A method according to claim 3 wherein said standard analysis is a debugging tool.

8. A method according to claim 7 wherein said image is a dump image and said event is a condition wherein said client is not active on said network.

9. A method according to claim 1 wherein said first protocol ordinarily used in said network for communication between said client and said server is TCP/IP.

10. A system for processing an image from a client to a server, the client and server being connected to a network, comprising:

means at said client for sending to said server on said network an image of conditions of said client upon the occurrence of an event at said client initiating a analysis, said means for sending including transmitting a number of packets of data making up said image;

means at said server for storing said packets making up said image; and means for converting said packets to a format usable by a standard analysis tool.

11. A system according to claim 10 wherein said image is a dump image, said conditions include memory and registers of said client, and said analysis includes failure analysis.

12. A system according to claim 11 wherein said image includes an operating system being executed by said client.

13. A system according to claim 12 wherein said operating system is loadable from said server upon boot-up of said client.

14. A system according to claim 13 wherein said operating system is JavaOS.

15. A system according to claim 14 wherein said image is converted to a format that is understood by a source-level debugger at said server.

16. A system according to claim 12 wherein said standard analysis is a debugging tool.

17. A system according to claim 16 wherein said image is a dump image and said event is a condition wherein said client is not active on said network.

18. A system according to claim 10 wherein said first protocol ordinarily used in said network for communication between said client and said server is TCP/IP.

* * * * *

UNITED STATES PATENT AND TRADEMARK OFFICE
CERTIFICATE OF CORRECTION

PATENT NO.   : 6,430,707 B1
DATED        : August 6, 2002
INVENTOR(S)  : Matthews et al.

It is certified that error appears in the above-identified patent and that said Letters Patent is hereby corrected as shown below:

<u>Column 8,</u>
Lines 1-9, replace:
"A system for processing an image from a client to a server, the client and server being connected to a network, comprising:
     means at said client for sending to said server on said network an image of conditions of said client upon the occurrence of an event at said client initiating a analysis,
          said means for sending including transmitting a number of packets of data making up said image;"
with:
-- A system for processing an image from a client to a server, the client and server being connected <u>utilizing a first protocol</u> to a network, comprising:
     means at said client for sending to said server on said network <u>utilizing a second protocol</u> an image of conditions of said client upon the occurrence of an event at said client initiating a analysis,
          said means for sending including transmitting a number of packets of data making up said image; --

Signed and Sealed this

First Day of April, 2003

JAMES E. ROGAN
*Director of the United States Patent and Trademark Office*